United States Patent
Noh et al.

(10) Patent No.: US 12,385,974 B2
(45) Date of Patent: Aug. 12, 2025

(54) DEVICE AND METHOD FOR PROVIDING PHYSICALLY UNCLONABLE FUNCTION WITH HIGH RELIABILITY

(71) Applicant: SAMSUNG ELECTRONICS CO., LTD., Suwon-si (KR)

(72) Inventors: Sumin Noh, Suwon-si (KR); Yongki Lee, Suwon-si (KR); Jieun Park, Suwon-si (KR); Yunhyeok Choi, Suwon-si (KR); Bohdan Karpinskyy, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/538,692

(22) Filed: Dec. 13, 2023

(65) Prior Publication Data

US 2024/0201256 A1    Jun. 20, 2024

(30) Foreign Application Priority Data

Dec. 16, 2022    (KR) .................. 10-2022-0177328

(51) Int. Cl.
*G01R 31/3177* (2006.01)
*H04L 9/32* (2006.01)

(52) U.S. Cl.
CPC ........ *G01R 31/3177* (2013.01); *H04L 9/3278* (2013.01)

(58) Field of Classification Search
CPC .................. G01R 31/3177; H04L 9/3278
See application file for complete search history.

(56) References Cited

U.S. PATENT DOCUMENTS

| | | | |
|---|---|---|---|
| 10,630,493 B2 | 4/2020 | Shor et al. | |
| 10,734,047 B1 | 8/2020 | Mahatme et al. | |
| 10,770,146 B2 * | 9/2020 | Lu | H04L 9/3247 |

(Continued)

FOREIGN PATENT DOCUMENTS

KR    10-2021-0024805 A    3/2021

OTHER PUBLICATIONS

Liang et al., A Wide-Range Variation-Resilient Physically Unclonable Function in 28 nm, Mar. 2020, IEEE, vol. 55, No. 3, pp. 817-825 (Year: 2020).*

Al-Haidary et al., Physically Unclonable Functions (PUFs): A Systematic Literature Review, Dec. 2018, IEEE, pp. 1-6. (Year: 2018).*

Scholzl et al., Hybrid low-voltage physical unclonable function based on inkjet-printed metal-oxide transistors, 2020, Nature Communication, pp. 1-11. (Year: 2020).*

(Continued)

*Primary Examiner* — John J Tabone, Jr.
(74) *Attorney, Agent, or Firm* — Sughrue Mion, PLLC

(57) ABSTRACT

A device is provided. The device includes: a plurality of physically unclonable function (PUF) cells, each of the plurality of PUF cells including at least one logic gate and being configured to generate an output signal based on at least one threshold level of the at least one logic gate; a signal generator configured to generate an input signal that is provided to each of the plurality of PUF cells; and a controller configured to, in a test mode, generate a control signal to control the signal generator to vary the input signal to control the plurality of PUF cells to output a plurality of output signals according to the input signal, and identify at least one weak PUF cell from among the plurality of PUF cells based on the output signal generated by the at least one weak PUF cell being an unstable output signal. The controller is further configured to disconnect the plurality of PUF cells from the signal generator in a normal mode.

20 Claims, 21 Drawing Sheets

(56) References Cited

U.S. PATENT DOCUMENTS

| | | | |
|---|---|---|---|
| 10,848,327 | B2 | 11/2020 | Shifman et al. |
| 10,999,083 | B2 | 5/2021 | Shor et al. |
| 11,190,365 | B2 | 11/2021 | Lu |
| 11,405,223 | B2 | 8/2022 | La Rosa et al. |
| 2019/0378575 | A1* | 12/2019 | Lu ........................ G11C 29/50 |
| 2021/0243041 | A1* | 8/2021 | Schat .................... H03K 3/037 |
| 2021/0248275 | A1* | 8/2021 | Lee ...................... H04L 9/0866 |
| 2021/0250187 | A1* | 8/2021 | Lu ...................... H01L 27/0922 |
| 2022/0131713 | A1 | 4/2022 | Schifmann et al. |
| 2022/0271952 | A1* | 8/2022 | Kudva ................. H04L 9/0825 |
| 2024/0201256 | A1* | 6/2024 | Noh ..................... H04L 9/3278 |

OTHER PUBLICATIONS

Lee et al, Design of Resistor-Capacitor Physically Unclonable Function for Resource-Constrained IoT Devices 2020, www.mdpi.com/journal/sensors, pp. 1-16. (Year: 2020)*

Yizhak Shifman et al., "A 2 Bit/Cell Tilting SRAM-Based PUF With a BER of 3.1E-10 and an Energy of 21 FJ/Bit in 65nm", IEEE Open Journal of Circuits and Systems, vol. 1, Oct. 30, 2020, pp. 205-217, DOI:10.1109/OJCAS.2020.3034266.

Yizhak Shifman et al., "A Method to Utilize Mismatch Size to Produce an Additional Stable Bit in a Tilting SRAM-Based PUF", IEEE Access, vol. 8, Dec. 2, 2020, pp. 219137-219150, DOI: 10.1109/ACCESS.2020.3042092.

Communication dated Apr. 16, 2024 issued by the European Patent Office in European Application No. 23216819.5.

* cited by examiner

DEVICE AND METHOD FOR PROVIDING PHYSICALLY UNCLONABLE FUNCTION WITH HIGH RELIABILITY

CROSS-REFERENCE TO RELATED APPLICATION

This application is based on and claims priority under 35 U.S.C. § 119 to Korean Patent Application No. 10-2022-0177328, filed on Dec. 16, 2022, in the Korean Intellectual Property Office, the disclosure of which is incorporated by reference herein in its entirety.

BACKGROUND

The present disclosure relates to a physically unclonable function, and more particularly, to a device and a method for providing a physically unclonable function with high reliability.

A physically unclonable function may provide a unique value based on intrinsic characteristics of hardware. For example, pieces of hardware, such as semiconductor chips, manufactured through the same process may have minor variations and in this regard, may not be completely matched physically. Based on such variations, unique values of hardware may be extracted, and extracted values may be used in applications that require security, e.g., secure communication, secure data processing, user identification, firmware update, etc. Therefore, a component providing a physically unclonable function may be required to constantly provide a unique value.

SUMMARY

Example embodiments provide a device and a method for providing a physically unclonable function with high reliability by constantly providing a unique value.

According to an aspect of an example embodiment, a device includes: a plurality of physically unclonable function (PUF) cells, each of the plurality of PUF cells including at least one logic gate and being configured to generate an output signal based on at least one threshold level of the at least one logic gate; a signal generator configured to generate an input signal that is provided to each of the plurality of PUF cells; and a controller configured to, in a test mode, generate a control signal to control the signal generator to vary the input signal to control the plurality of PUF cells to output a plurality of output signals according to the input signal, and identify at least one weak PUF cell from among the plurality of PUF cells based on the output signal generated by the at least one weak PUF cell being an unstable output signal. The controller is further configured to disconnect the plurality of PUF cells from the signal generator in a normal mode.

According to another aspect of an example embodiment, a device includes: a plurality of PUF cells; a signal generator configured to generate an input signal that is provided to each of the plurality of PUF cells; and a controller configured to, in a test mode, generate a control signal to control the signal generator to vary the input signal to control the plurality of PUF cells to output a plurality of output signals according to the input signal, and identify at least one weak PUF cell from among the plurality of PUF cells based on an output signal generated by the at least one weak PUF cell being an unstable output signal. Each of the plurality of PUF cells includes at least one logic gate, is configured to generate the output signal independently of the input signal based on at least one threshold level of the at least one logic gate in a normal mode, and generate the output signal based on the input signal and the at least one threshold level in the test mode.

According to another aspect of an example embodiment, a method includes: providing an input signal to each of a plurality of physically unclonable function (PUF) cells in a test mode; in the test mode, changing the input signal; in the test mode, controlling the plurality of PUF cells to generate a plurality of output signals based on the input signal and at least one threshold level of at least one logic gate included in each of the plurality of PUF cells; in the test mode, identifying at least one weak PUF cell from among the plurality of PUF cells based on an output signal, among the plurality of output signals, generated by the at least one weak PUF cell being an unstable output signal; and generating the plurality of output signals independently of the input signal, based on the at least one threshold level, in a normal mode.

BRIEF DESCRIPTION OF DRAWINGS

The above and other aspects and features will be more apparent from the following description of example embodiments, taken in conjunction with the accompanying drawings, in which.

DETAILED DESCRIPTION

Example embodiments will be described more fully hereinafter with reference to the accompanying drawings.

Figure 1:
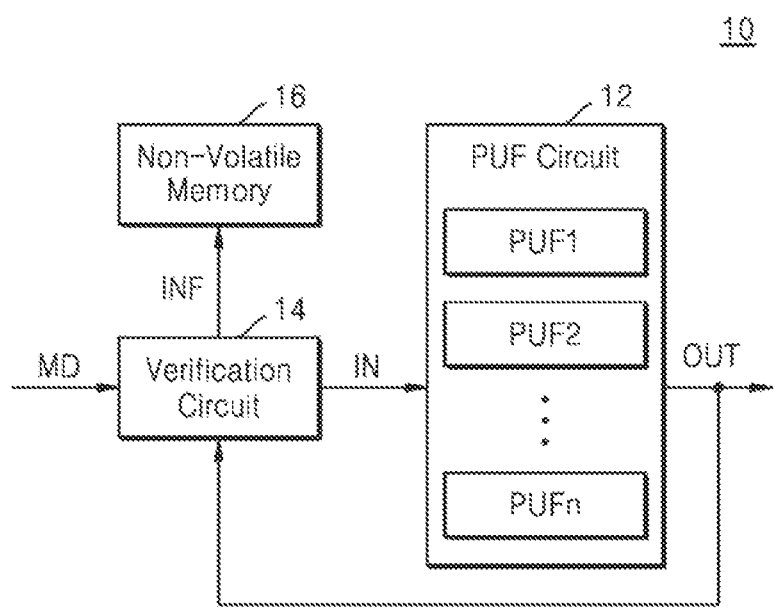
FIG. 1 is a block diagram showing a device according to an example embodiment.

FIG. 1 is a block diagram showing a device 10 according to an example embodiment. According to some example embodiments, the device 10 may include an integrated circuit manufactured through a semiconductor process. For example, the device 10 may include one or more chips, and the one or more chips may be included in one or more semiconductor packages. The device 10 may provide a physically unclonable function (PUF) and may be referred to as a PUF device herein. Referring to FIG. 1, the device 10 may include a PUF circuit 12, a verification circuit 14, and a non-volatile memory 16.

The PUF circuit 12 may receive an input signal IN from the verification circuit 14 and generate an output signal OUT. As described below, the input signal IN may be used to verify the PUF circuit 12 in a test mode. Also, while the output signal OUT may be used to verify the PUF circuit 12 in the test mode, the output signal OUT may also be used to provide a unique value corresponding to the device 10 in a normal mode. As shown in FIG. 1, the PUF circuit 12 may include first to n-th PUF cells PUF1 to PUFn (n is an integer greater than 1). Although the PUF circuit 12 including 32 PUF cells is mainly described herein (n=32), example embodiments are not limited thereto.

Each of the first to nth PUF cells PUF1 to PUFn may generate a unique output bit depending on its structure. According to some example embodiments, as described below with reference to FIGS. 2A to 2C, the first to n-th PUF cells PUF1 to PUFn may each output a unique output bit based on various variations occurring during a process of manufacturing the device 10 (e.g., a semiconductor process). For example, elements (e.g., transistors) and/or patterns included in the first to n-th PUF cells PUF1 to PUFn may have unique characteristics that are different from those of elements of other devices manufactured through the same semiconductor process, due to variations in height (or thickness), width, length, doping concentration, etc. Therefore, the output signal OUT generated based on output bits generated by the first to n-th PUF cells PUF1 to PUFn may be utilized for an operation that needs security in the device 10 or a system including the device 10.

The first to n-th PUF cells PUF1 to PUFn may include at least one weak PUF cell. As described below with reference to FIG. 3, a weak PUF cell may refer to a PUF cell that generates output bits that vary depending on age or the external environment, while a stable PUF cell may refer to a PUF cell that generates constant output bits regardless of age or the external environment. Due to the change in the output signal OUT of a weak PUF cell, utilization of the weak PUF cell in the PUF circuit 12 may be limited for an operation that needs security. Hardware and/or software that applies an error correction code to the output signal OUT may be added to provide constant output bits regardless of age or external environment. However, when the number of weak PUF cells is large, resources required for the error correction code may increase significantly. Herein, a weak PUF cell may simply be referred to as a weak cell.

As described below with reference to the drawings, the verification circuit 14 may detect a weak cell from among the first to n-th PUF cells PUF1 to PUFn, and the detected weak cell may be excluded from generation of information unique to the device 10. Accordingly, the device 10 may provide the constant output signal OUT, and the application of an error correction code on the output signal OUT may be eliminated or reduced. As a result, costs due to instability of a PUF may be eliminated or reduced. Also, the first to n-th PUF cells PUF1 to PUFn may be verified through a simple structure, and thus, the device 10 may be employed in various applications.

The verification circuit 14 may receive a mode signal MD from the outside of the device 10, receive the output signal OUT from the PUF circuit 12, and provide the input signal IN to the PUF circuit 12. The verification circuit 14 may be set to a test mode or a normal mode based on the mode signal MD. In the test mode, the verification circuit 14 may generate the input signal IN for verifying the PUF circuit 12 and detect at least one weak PUF cell from among the first to n-th PUF cells PUF1 to PUFn based on the output signal OUT, which is generated by the PUF circuit 12 in response to the input signal IN. The verification circuit 14 may store cell information INF regarding the at least one detected weak PUF cell or PUF cells (i.e., stable PUF cells) other than at least one weak PUF cell from among the first to n-th PUF cells PUF1 to PUFn in the non-volatile memory 16.

The verification circuit 14 may be set to the normal mode based on the mode signal MD and may deactivate the input signal IN in the normal mode. Therefore, the PUF circuit 12 may generate the output signal OUT based on the input signal IN in the test mode and may generate the output signal OUT independently of the input signal IN in the normal mode. According to some example embodiments, the device 10 may be set to the test mode during a manufacturing process, and, when the verification of the PUF circuit 12 is completed (i.e., the cell information INF is stored in the non-volatile memory 16 completely), the device 10 may be set to the normal mode. Examples of the verification circuit 14 are described below with reference to FIGS. 4A and 4B.

The non-volatile memory 16 may not lose data stored therein even when the power supply is interrupted and may be accessed by the verification circuit 14. According to some example embodiments, the non-volatile memory 16 may include a rewritable memory, such as flash memory, resistive random access memory (RRAM), etc. According to some example embodiments, the non-volatile memory 16 may include one-time programmable (OTP) memory, such as an antifuse array. The cell information INF stored in the non-volatile memory 16 may be used to identify at least one weak PUF cell and/or stable PUF cells from among the first to n-th PUF cells PUF1 to PUFn in the normal mode, and thus, a value unique to the device 10 may be constantly generated from the output signal OUT in the normal mode.

Figure 2A:
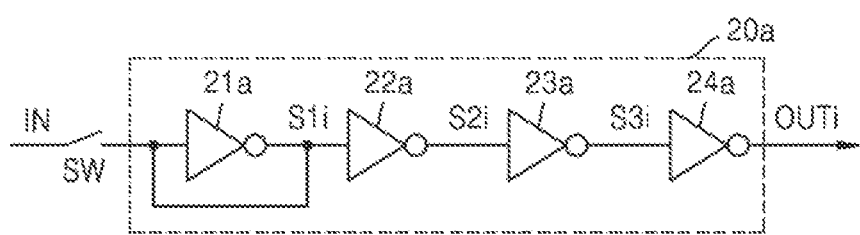
FIGS. 2A, 2B and 2C are diagrams showing examples of physically unclonable function (PUF) cells according to example embodiments.
Figure 2B:
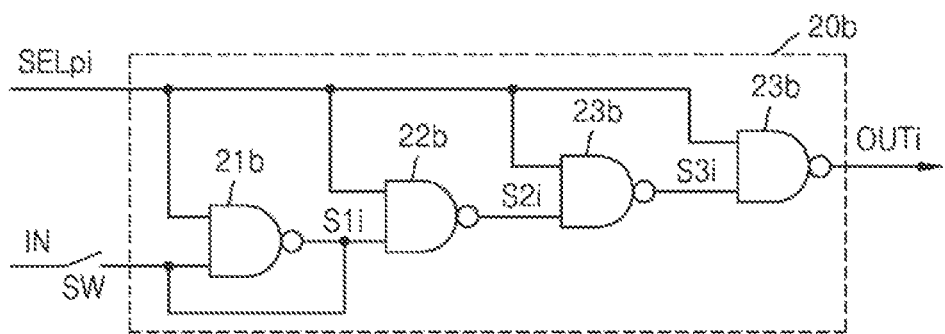
Figure 2C:
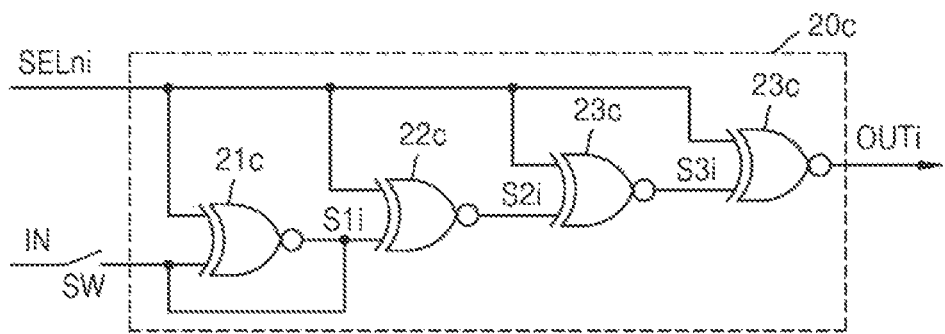

FIGS. 2A to 2C are diagrams showing examples of PUF cells according to example embodiments. For example, FIGS. 2A to 2C show PUF cells 20a, 20b, and 20c that generate unique output bits based on differences between the threshold levels of logic gates. According to some example embodiments, each of the first to n-th PUF cells PUF1 to PUFn of FIG. 1 may correspond to one of the PUF cells 20a, 20b, and 20c of FIGS. 2A to 2C. Hereinafter, descriptions of FIGS. 2A to 2C identical to each other are omitted.

Referring to FIG. 2A, a PUF cell 20a may include first to fourth inverters 21a to 24a and generate an output bit OUTi. From among the first to fourth inverters 21a to 24a, the first inverter 21a and the second inverter 22a may be designed and manufactured to have the same structure, and the first inverter 21a may have an input and an output electrically connected to each other. In the normal mode, a switch SW may be turned off, and thus, a first signal S1i may have a voltage corresponding to a first threshold level of the first inverter 21a, that is, the boundary level of the first inverter 21a for distinguishing a low level and a high level. The second inverter 22a may generate a second signal S2i from the first signal S1i based on a second threshold level of the second inverter 22a, and thus, the second signal S2i may depend on a difference between the first threshold level and the second threshold level.

The third inverter 23a and the fourth inverter 24a may generate a third signal S3i and the output bit OUTi, respectively, and amplify the second signal S2i to a low level and a high level by propagating the second signal S2i. According to some example embodiments, the third inverter 23a and the fourth inverter 24a may be omitted in the PUF cell 20a. According to some example embodiments, the PUF cell 20a may further include additional inverters subsequent to the fourth inverter 24a. The first threshold level and the second threshold level may be respectively unique to the first inverter 21a and the second inverter 22a due to process variations and may be different from threshold levels of inverters included in other PUF cells. Therefore, the output bit OUTi may exhibit low predictability.

In the test mode, the switch SW may be turned on, and thus, the first signal S1i may depend on the input signal IN as well as the first threshold level. When the second signal S2i is changed (i.e., flipped) according to the second threshold level while the input signal IN is increasing or decreasing within a pre-defined range by the verification circuit 14 of FIG. 1, it may be determined that the difference between the first threshold level and the second threshold level is relatively small. When the difference between the first threshold level and the second threshold level is small, the second signal S2i may be unstable, and the third signal S3i and the output bit OUTi may also be unstable or sensitive to temperature or supply voltage. The verification circuit 14 may provide the input signal IN that increases or decreases in the test mode to the PUF cell 20a and may identify whether the PUF cell 20a is a weak PUF cell based on the output bit OUTi. For example, the verification circuit 14 may determine whether the output bit OUTi is stable while the input signal IN changes within the pre-defined range by the verification circuit 14. When it is determined the output bit OUTi is stable, the verification circuit 14 may determine the PUF cell 20a is a stable PUF cell. The stable output bit OUTi may be 1 or 0, depending on characteristics of the PUF cell20a. When it is determined the output bit OUTi is not stable, the verification circuit 14 may determine the PUF cell 20a is a weak PUF cell.

Referring to FIG. 2B, a PUF cell 20b may include first to fourth NAND gates 21b to 24b and generate the output bit OUTi. The first to fourth NAND gates 21b to 24b may each have a first input for receiving a selection bit SELpi. From among the first to fourth NAND gates 21b to 24b, the first NAND gate 21b and the second NAND gate 22b may be designed and manufactured to have the same structure, and the first NAND gate 21b may have a second input and an output electrically connected to each other. When the selection bit SELpi has a high level, the first to fourth NAND gates 21b to 24b may each operate as an inverter, and the PUF cell 20b may function in the same regard as the PUF cell 20a of FIG. 2A. On the other hand, when the selection bit SELpi has a low level, the output bit OUTi may have a high level regardless of the first to third signals S1i to S3i. Therefore, the PUF cell 20b may be selected by a selection bit SELpi, having a high level and a selected PUF cell 20b may generate a unique output bit OUTi, whereas an unselected PUF cell 20b may generate a output bit OUTi having a high level.

Referring to FIG. 2C, a PUF cell 20c may include first to fourth NOR gates 21c to 24c and generate the output bit OUTi. The first to fourth NOR gates 21c to 24c may each have a first input for receiving a selection bit SELni. From among the first to fourth NOR gates 21c to 24c, the first NOR gate 21c and the second NOR gate 22c may be designed and manufactured to have the same structure, and the first NOR gate 21c may have a second input and an output electrically connected to each other. When the select bit SELni has a low level, the first to fourth NOR gates 21c to 24c may each operate as an inverter, and the PUF cell 20c may function in the same regard as the PUF cell 20a of FIG. 2A. On the other hand, when the selection bit SELni has a high level, the output bit OUTi may have a low level regardless of the first to third signals S1i to S3i. Therefore, the PUF cell 20c may be selected by a selection bit SELni having a low level, and a selected PUF cell 20c may generate a unique output bit OUTi, whereas an unselected PUF cell 20c may generate a output bit OUTi having a low level.

Herein, PUF cells, such as the PUF cells 20a, 20b, and 20c of FIGS. 2A to 2C, that generate unique bits based on differences between threshold levels of logic gates are mainly described, but a PUF cell may have any structure for generating a unique bit signal. For example, a PUF cell may have an static random access memory (SRAM) type PUF structure based on a value stored in a SRAM cell, may have a ring oscillator structure based on frequency variation, a leakage-based PUF structure based on a leakage current, or an arbiter PUF structure in which a path of a signal is arbitrarily determined.

Figure 3:
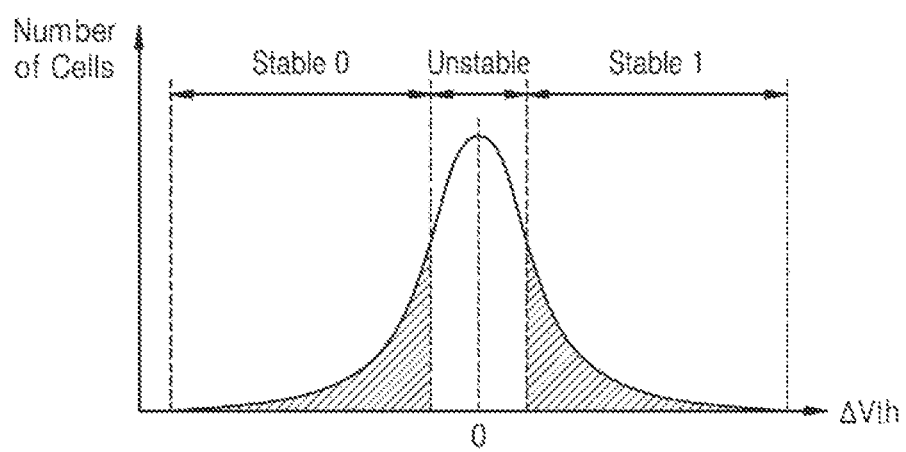
FIG. 3 is a graph showing the distribution of PUF cells according to an example embodiment.

FIG. 3 is a graph showing the distribution of PUF cells according to an example embodiment. As described above with reference to the drawings, a PUF cell may output a unique bit based on differences between threshold levels of logic gates.

PUF cells manufactured through a semiconductor process may have a distribution according to differences between threshold levels. For example, as shown in FIG. 3, PUF cells having a zero threshold level difference ΔVth or threshold level differences ΔVth close to zero may be distributed in a relatively high density and generate unstable output bits. On the other hand, PUF cells having threshold level differences ΔVth far from zero may be distributed in a relatively low density and may generate stable output bits (i.e., 0 or 1). As described above with reference to the drawings, the verification circuit 14 of FIG. 1 may detect unstable PUF cells, that is, PUF cells having threshold level differences ΔVth close to zero.

Figure 4A:
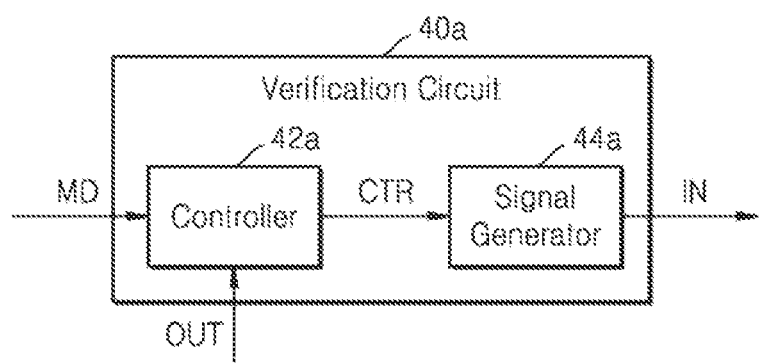
FIGS. 4A and 4B are block diagrams showing examples of a verification circuit according to example embodiments.
Figure 4B:
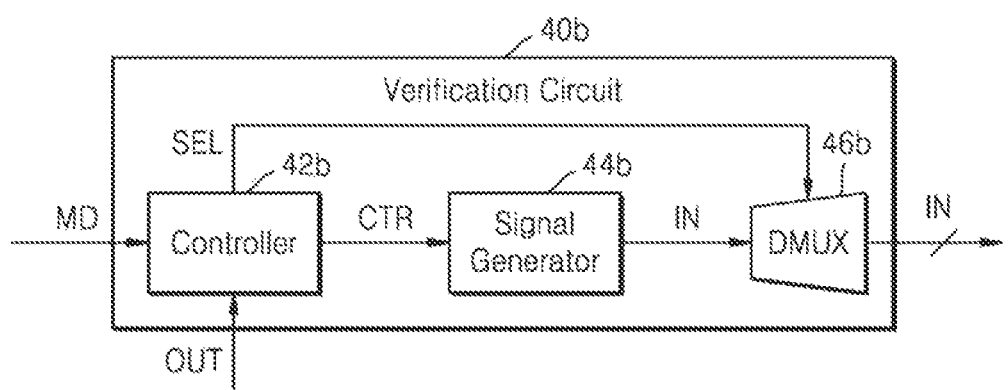

FIGS. 4A and 4B are block diagrams showing examples of a verification circuit according to example embodiments. As described above with reference to FIG. 1, verification circuits 40a and 40b of FIGS. 4A and 4B may each receive the mode signal MD and the output signal OUT, and generate the input signal IN. Hereinafter, descriptions of FIGS. 4A and 4B identical to each other are omitted.

Referring to FIG. 4A, a verification circuit 40a may include a controller 42a and a signal generator 44a. The controller 42a may receive the mode signal MD and the output signal OUT, and generate a control signal CTR. The controller 42a may identify a mode, that is, a test mode or a normal mode, from the mode signal MD, may control the signal generator 44a through the control signal CTR, and detect a weak PUF cell based on the output signal OUT. For example, when the test mode is identified from the mode signal MD, the controller 42a may generate the control signal CTR, such that the input signal IN varies. The controller 42a may monitor the output signal OUT while the input signal IN varies and determine whether a PUF cell is a weak PUF cell based on the output signal OUT. In some example embodiments, the signal generator 44a may include a switch that receives the control signal CTR, and the controller 42a may generate the control signal CTR, such that the signal generator 44a is disconnected from the PUF circuit 12 by the switch in the normal mode. According to some example embodiments, the controller 42a may include hardware logic or may include software and a processor for executing the software.

The signal generator 44a may generate the input signal IN in response to the control signal CTR. For example, the signal generator 44a may generate the input signal IN having a magnitude corresponding to the value of the control signal CTR. According to some example embodiments, the signal generator 44a may be disabled by the controller 42a in the normal mode. Therefore, power consumed by the signal generator 44a may be eliminated and power consumption of a device including the verification circuit 40a may be reduced in the normal mode. An example of the signal generator 44a is described below with reference to FIG. 6.

Referring to FIG. 4B, a verification circuit 40b may include a controller 42b, a signal generator 44b, and a demultiplexer 46b. The controller 42b may receive the mode signal MD and the output signal OUT and generate the control signal CTR and a selection signal SEL. The signal generator 44b may generate the input signal IN based on the control signal CTR. The demultiplexer 46b may receive the selection signal SEL and the input signal IN, and output the input signal IN through one of a plurality of signal lines according to the selection signal SEL. According to some example embodiments, the controller 42b may generate the selection signal SEL, such that the signal generator 44b is disconnected from the PUF circuit 12 by the demultiplexer 46b in the normal mode.

As described above with reference to FIGS. 2B and 2C, PUF cells may receive a selection bit, and a PUF cell receiving an activated selection bit may be selected. The controller 42b may generate the selection signal SEL including a plurality of selection bits and may provide the selection signal SEL to PUF cells and the demultiplexer 46b. Accordingly, the demultiplexer 46b may provide the input signal IN to a PUF cell selected from among PUF cells by the selection signal SEL. According to some example embodiments, the demultiplexer 46b may float signal lines connected to unselected PUF cells. According to some example embodiments, the PUF circuit 12 may include a multiplexer that receives the selection signal SEL, and the multiplexer may output an output bit generated by a selected PUF cell as the output signal OUT.

Figure 5:
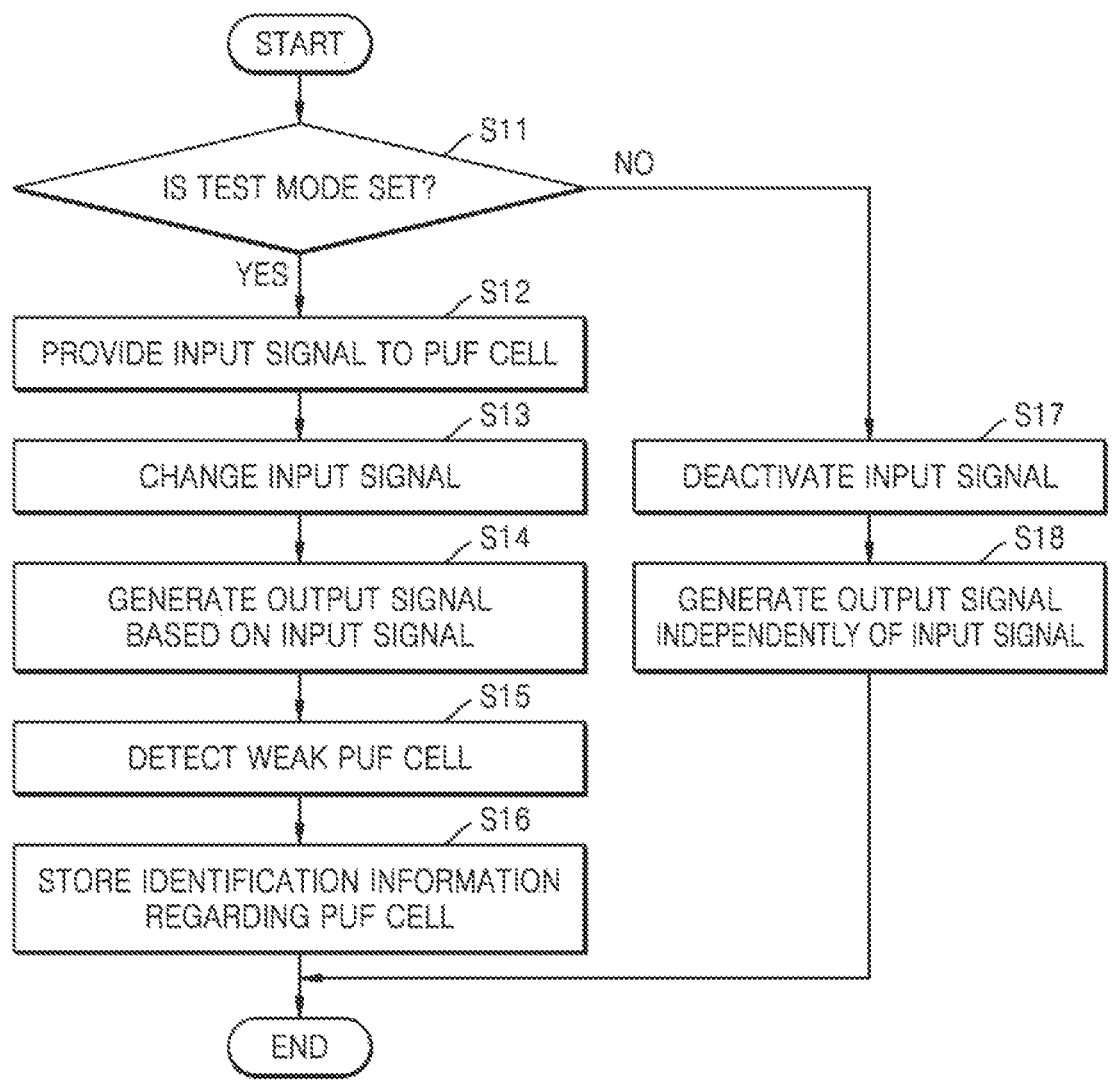
FIG. 5 is a flowchart of a method of providing a physically unclonable function, according to an example embodiment.

FIG. 5 is a flowchart of a method of providing a PUF, according to an example embodiment. As shown in FIG. 5, the method of providing a PUF may include a plurality of operations S11 to S18. According to some example embodiments, the method of FIG. 5 may be performed by device 10 of FIG. 1. Hereinafter, FIG. 5 is described with reference to FIG. 1.

Referring to FIG. 5, in operation S11, it may be determined whether a current mode is a test mode. For example, the verification circuit 14 may identify a mode based on the mode signal MD and may determine whether an identified mode is the test mode. As shown in FIG. 5, operations S12 to S16 may be performed subsequently when the test mode is identified. Operations S17 and S18 may be performed subsequently when the test mode is not identified, that is, when a normal mode is identified.

When the test mode is identified, the input signal IN may be provided to a PUF cell in operation S12. For example, the verification circuit 14 may generate the input signal IN and provide the input signal IN to the PUF circuit 12 including the first to n-th PUF cells PUF1 to PUFn. In operation S13, the input signal IN may be changed. For example, the verification circuit 14 may generate the input signal IN having an increasing or decreasing magnitude. In operation S14, the output signal OUT may be generated based on the input signal IN. For example, at least one of the first to n-th PUF cells PUF1 to PUFn included in the PUF circuit 12 may generate at least one output bit based on a difference between threshold levels and the input signal IN, and the output signal OUT may include the at least one output bit. In operation S15, a weak PUF cell may be detected. For example, the verification circuit 14 may monitor the output signal OUT while the input signal IN is varying and determine a PUF cell as a weak PUF cell when the output signal OUT changes, i.e., flips. In operation S16, identification information regarding a PUF cell may be stored. For example, when a weak PUF cell is detected in operation S15, the verification circuit 14 may store identification information (e.g., an index) regarding the weak PUF cell in the non-volatile memory 16. Alternatively, the verification circuit 14 may store identification information regarding stable PUF cells in the non-volatile memory 16.

When the normal mode is identified, the input signal IN may be deactivated in operation S17. For example, the verification circuit 14 may float nodes that output the input signal IN, and thus the verification circuit 14 may be electrically disconnected from the PUF circuit 12. In operation S18, the output signal OUT may be generated independently of the input signal IN. For example, the first to n-th PUF cells PUF1 to PUFn included in the PUF circuit 12 may each generate a unique output bit based on a difference between threshold voltages in the normal mode. Based on information stored in operation S16, output bits generated from weak PUF cells from among the first to n-th PUF cells PUF1 to PUFn may be ignored.

Figure 6:
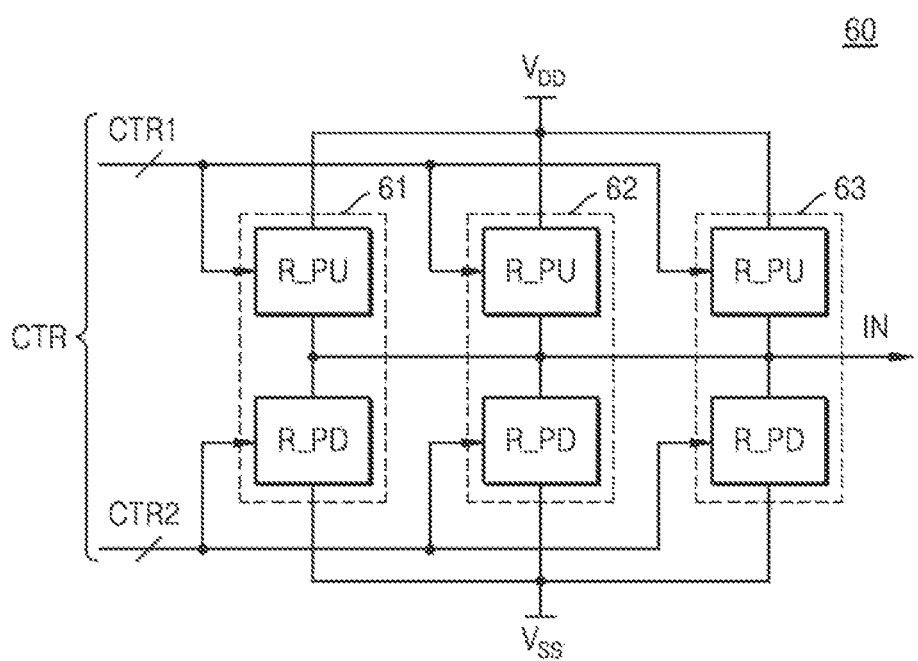
FIG. 6 is a block diagram showing a signal generator according to an example embodiment.

FIG. 6 is a block diagram showing a signal generator 60 according to an example embodiment. As described above with reference to FIGS. 4A and 4B, the signal generator 60 may generate an input signal IN in response to the control signal CTR. As shown in FIG. 6, the signal generator 60 may include a first resistor string 61, a second resistor string 62, and a third resistor string 63 connected to one another in parallel between a positive supply voltage $V_{DD}$ and a negative supply voltage $V_{SS}$ (or ground potential). According to some example embodiments, the signal generator 60 may include less than three or more than three resistor strings.

A resistor string may include a pull-up circuit and a pull-down circuit. For example, as shown in FIG. 6, the first resistor string 61 may include a pull-up circuit R_PU between a positive voltage node to which the positive supply voltage $V_{DD}$ is applied and an input node by which the input signal IN is generated, and a pull-down circuit R_PD between the input node and a negative voltage node to which the negative supply voltage $V_{SS}$ is applied. Similarly, the second resistor string 62 and the third resistor string 63 may each include the pull-up circuit R_PU and the pull-down circuit R_PD.

The control signal CTR may include a first control signal CTR1 and a second control signal CTR2. The pull-up circuit R_PU may receive the first control signal CTR1 and adjust the resistance between the positive voltage node and the input node according to the first control signal CTR1. Also, the pull-down circuit R_PD may receive the second control signal CTR2 and adjust the resistance between the input node and the negative voltage node according to the second control signal CTR2. Therefore, the voltage of the input node, that is, the input signal IN may be adjusted according to the first control signal CTR1 and the second control signal CTR2. Examples of the pull-up circuit R_PU and the pull-down circuit R_PD are described below with reference to FIG. 7.

Figure 7:
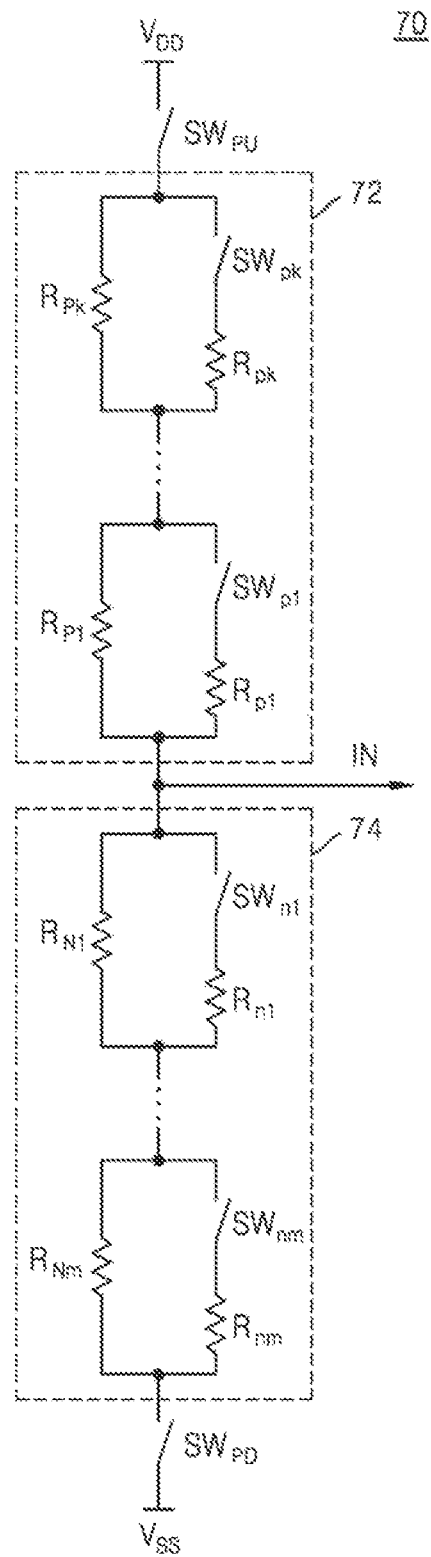
FIG. 7 is a circuit diagram showing a resistor string according to an example embodiment.

FIG. 7 is a circuit diagram showing a resistor string 70 according to an example embodiment. As described above with reference to FIG. 6, a signal generator may include resistor strings connected to one another in parallel. As shown in FIG. 7, the resistor string 70 may include a pull-up circuit 72, a pull-down circuit 74, a pull-up switch $SW_{PU}$, and a pull-down switch $SW_{PD}$. According to some example embodiments, a control signal may be a multi-bit signal, and each of the switches shown in FIG. 7 may be turned on or off by one bit of the control signal.

The pull-up circuit 72 may include a series of resistors $R_{P1}$ to $R_{Pk}$ connected in series between a positive voltage node at which the positive supply voltage $V_{DD}$ is applied and an input node by which the input signal IN is generated (k is an integer greater than 1). The pull-up circuit 72 may further include a resistance circuit connected to each of the series of resistors $R_{P1}$ to $R_{Pk}$ in parallel, and the resistance circuit may include a resistor and a switch connected to each other in series. For example, a resistor $R_{p1}$ and a switch $SW_{p1}$ may be connected to each other in series and may be connected to a resistor Rpi in parallel. Also, a resistor $R_{pk}$ and a switch $SW_{pk}$ may be connected to each other in series and may be connected to a resistor $R_{Pk}$ in parallel. Switches included in the pull-up circuit 72 may be turned on or turned off by a control signal, e.g., the first control signal CTR1 of FIG. 6, and thus, the pull-up circuit 72 may provide a resistance adjusted by the first control signal CTR1.

The pull-down circuit 74 may include a series of resistors $R_{N1}$ to $R_{Nm}$ connected in series between the input node and a negative voltage node to which a negative supply voltage $V_{SS}$ is applied (m is an integer greater than 1). The pull-down circuit 74 may further include a resistance circuit connected to each of the series of resistors $R_{N1}$ to $R_{Nm}$ in parallel, and the resistance circuit may include a resistor and a switch connected to each other in series. For example, a resistor $R_{n1}$ and a switch $SW_{n1}$ may be connected to each other in series and may be connected to a resistor $R_{N1}$ in parallel. Also, a resistor $R_{nm}$ and a switch $SW_{nm}$ may be connected to each other in series and may be connected to a resistor $R_{Nm}$ in parallel. Switches included in the pull-down circuit 74 may be turned on or turned off by a control signal, e.g., the second control signal CTR2 of FIG. 6, and thus, the pull-down circuit 74 may provide a resistance adjusted by the second control signal CTR2.

The pull-up switch $SW_{PU}$ may be connected between the positive voltage node and the pull-up circuit 72, and may be turned on or off by a control signal, e.g., the first control signal CTR1 of FIG. 6. The resistance between the positive voltage node and the input node may depend on the pull-up circuit 72 when the pull-up switch $SW_{PU}$ is turned on, whereas the input node may be electrically disconnected from the positive voltage node when the pull-up switch $SW_{PU}$ is turned off.

The pull-down switch $SW_{PD}$ may be connected between the pull-down circuit 74 and the negative voltage node and may be turned on or off by a control signal, e.g., the second control signal CTR2 of FIG. 6. The resistance between the input node and the negative voltage node may depend on the pull-down circuit 74 when the pull-down switch $SW_{PD}$ is turned on, whereas the input node may be electrically disconnected from the negative voltage node when the pull-down switch $SW_{PD}$ is turned off.

Figure 8A:
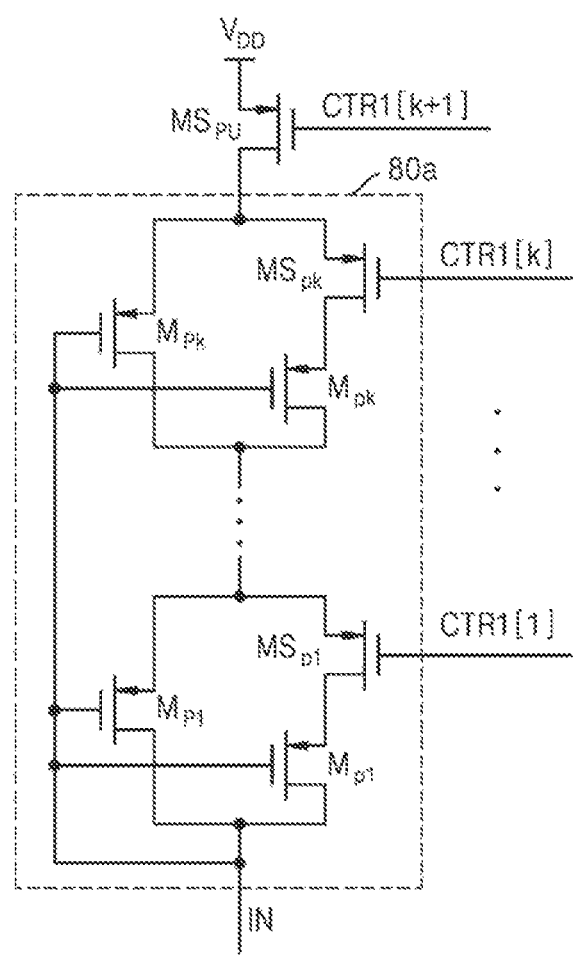
FIG. 8A is a circuit diagram showing a pull-up circuit according to an example embodiment.
Figure 8B:
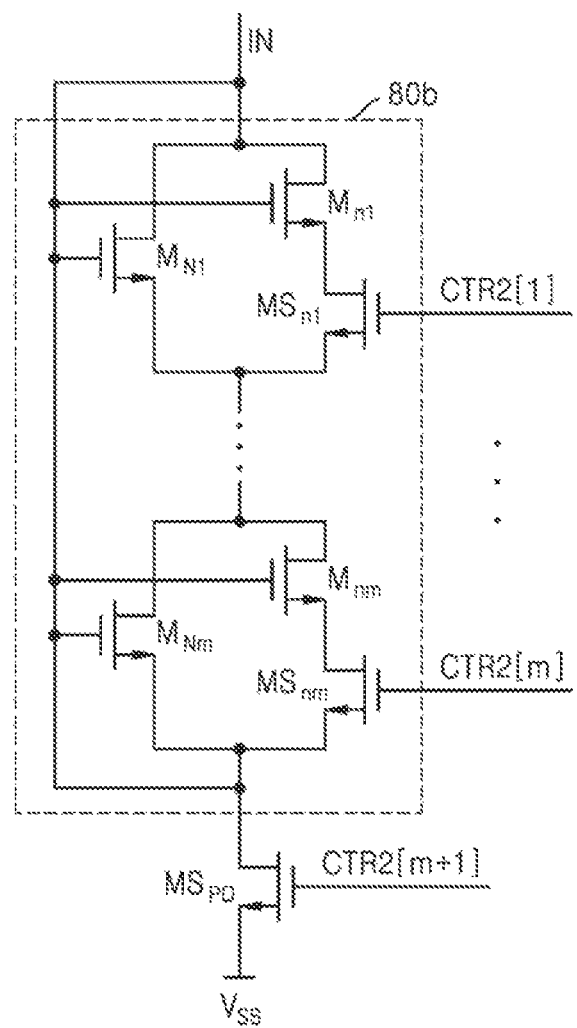
FIG. 8B is a circuit diagram showing a pull-down circuit according to an example embodiment.

FIG. 8A is a circuit diagram showing a pull-up circuit according to an example embodiment, and FIG. 8B is a circuit diagram showing a pull-down circuit according to an example embodiment. For example, the circuit diagram of FIG. 8A shows a p-channel field effect transistor (PFET) $MS_{PU}$ corresponding to the pull-up switch $SW_{PU}$ of FIG. 7 together with a pull-up circuit 80a, and the circuit diagram of FIG. 8B shows an n-channel field effect transistor (NFET) MSPD corresponding to the pull-down switch $SW_{PD}$ of FIG. 7 together with a pull-down circuit 80b. As shown in FIGS. 8A and 8B, a resistor string may be implemented with only transistors, and thus, a resistor string may be implemented by using standard cells, as described below with reference to FIGS. 11 and 12.

Referring to FIG. 8A, resistors and switches included in the pull-up circuit 80a may each be implemented by a transistor. For example, the pull-up circuit 80a may include a PFET $M_{P1}$ and a PFET $M_{Pk}$ respectively corresponding to the resistor $R_{P1}$ and the resistor $R_{Pk}$ of FIG. 7. Also, the pull-up circuit 80a may include a PFET $MS_{p1}$ and a PFET $M_{p1}$ respectively corresponding to the switch $SW_{p1}$ and the resistor $R_{p1}$ of FIG. 7 and may include a PFET $MS_{pk}$ and a PFET $M_{pk}$ respectively corresponding to the switch $SW_{pk}$ and the resistor $R_{pk}$ of FIG. 7. As shown in FIG. 8A, gates of PFETs corresponding to resistors may be commonly connected to an input node at which the input signal IN is generated, and gates of PFETs corresponding to switches may receive k+1 bits of the first control signal CTR1, respectively. In FIG. 8A, the first control signal CTR1 may be an active low signal having a low level when activated.

Referring to FIG. 8B, resistors and switches included in the pull-down circuit 80b may each be implemented by a transistor. For example, the pull-down circuit 80b may include an NFET $M_{N1}$ and an NFET $M_{Nm}$ respectively corresponding to the resistor $R_{N1}$ and the resistor $R_{Nm}$ of FIG. 7. Also, the pull-down circuit 80b may include an NFET $MS_{n1}$ and an NFET $M_{n1}$ respectively corresponding to the switch $SW_{n1}$ and the resistor $R_{n1}$ of FIG. 7 and may include an NFET $MS_{nm}$ and an NFET $M_{nm}$ respectively corresponding to the switch $SW_{nm}$ and resistor $R_{nm}$ of FIG. 7. As shown in FIG. 8B, gates of NFETs corresponding to resistors may be commonly connected to an input node at which the input signal IN is generated, and gates of NFETs corresponding to switches may receive m+1 bits of the second control signal CTR2, respectively. In FIG. 8B, the second control signal CTR2 may be an active high signal having a high level when activated.

Figure 9:
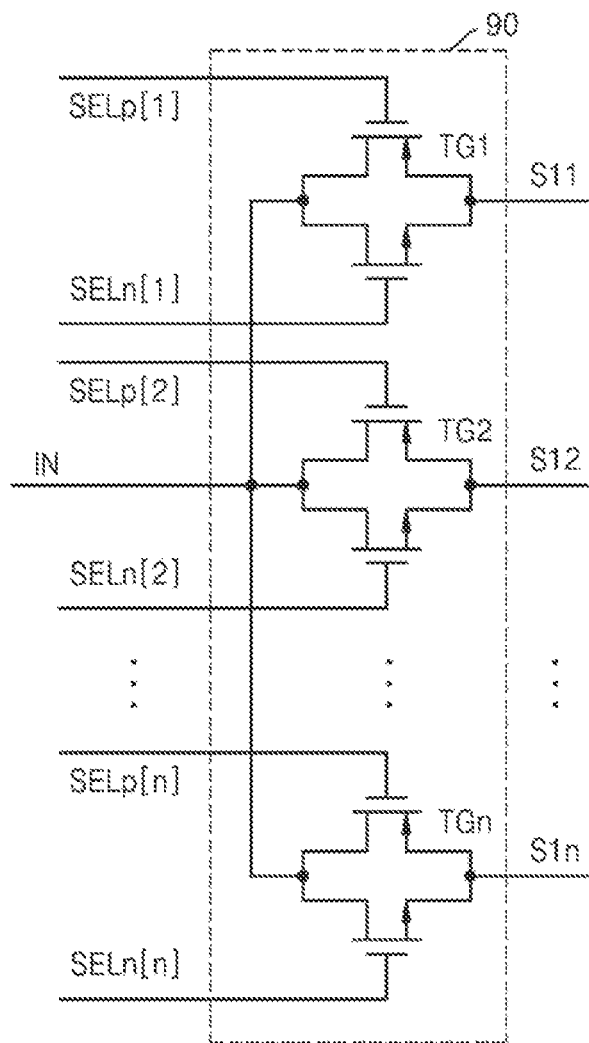
FIG. 9 is a circuit diagram showing a demultiplexer according to an example embodiment.

FIG. 9 is a circuit diagram showing a demultiplexer according to an example embodiment. As described above with reference to FIG. 4B, a demultiplexer 90 may provide the input signal IN to one of a plurality of PUF cells based on the selection signal SEL. In the example of FIG. 9, the selection signal SEL of FIG. 4B may include an n-bit non-inverted selection signal SELp and an n-bit inverted selection signal SELn, and the inverted selection signal SELn may correspond to a signal obtained by inverting the non-inverted selection signal SELp (e.g., bits of the n-bit inverted selection signal SELn may correspond to inverted bits of the n-bit non-inverted selection signal SELp).

Referring to FIG. 9, the demultiplexer 90 may include transmission gates. For example, as shown in FIG. 9, the demultiplexer 90 may include first to n-th transmission gates TG1 to TGn. Each of the first to n-th transmission gates TG1 to TGn may include a PFET and an NFET. Gates of the PFET of the transmission gates may receive a corresponding bit of the n-bit non-inverted selection signal SELp. Gates of the NFET of the transmission gates may receive a corresponding bit of the n-bit inverted selection signal SELn. The first to n-th transmission gates TG1 to TGn may receive the input signal IN in common. Also, the first to n-th transmission gates TG1 to TGn may receive n-bits of the non-inverted selection signal SELp and receive n-bits of the inverted selection signal SELn, respectively. The first to n-th transmission gates TG1 to TGn may provide an input signal to a PUF cell in response to an activated bit (i.e., a bit having a low level) of the non-inverted selection signal SELp or based on an activated bit (i.e., a bit having a high level) of the inverted selection signal SELn. For example, the first transmission gate TG1 may provide the input signal IN as a first signal S11 of a first PUF cell in response to a first bit SELp[1] of the activated non-inverted selection signal SELp and a first bit SELn[1] of the activated inverted selection signal SELn.

According to some example embodiments, the demultiplexer 90 may electrically disconnect a signal generator generating the input signal IN from PUF cells in the normal mode. For example, as described above with reference to FIG. 5, the input signal IN provided to a PUF circuit in the normal mode may be deactivated, and, to this end, a deactivated non-inverted selection signal SELp and a deactivated inverted selection signal SELn may be provided to the demultiplexer 90. The first to n-th transmission gates TG1 to TGn may electrically disconnect the signal generator from first to n-th PUF cell in response to the deactivated non-inverted selection signal SELp and the deactivated inverted selection signal SELn, and thus, first signals S11 to Sin may each have a level corresponding to the threshold level of a logic gate independently of the input signal IN.

Figure 10:
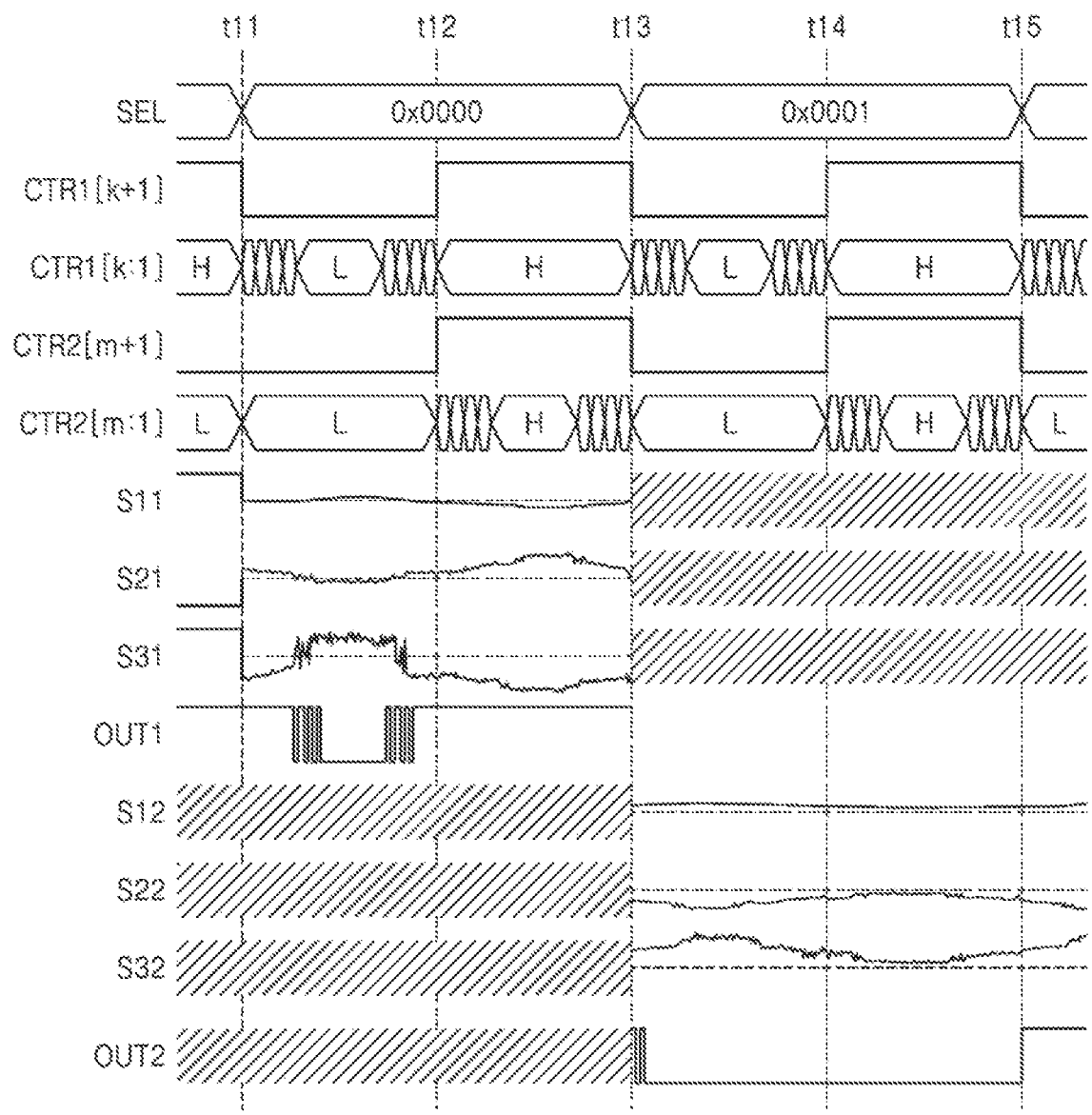
FIG. 10 is a timing diagram showing an operation of providing a physically unclonable function according to an example embodiment.

FIG. 10 is a timing diagram showing an operation of providing a PUF according to an example embodiment. For example, the timing diagram of FIG. 10 shows an operation of testing 32 PUF cells in the test mode (n=32), wherein the selection signal SEL may be a 32-bit signal. According to some example embodiments, the operation of FIG. 10 may be performed by the verification circuit 40b of FIG. 4B. In FIG. 10, the signal generator 44b of FIG. 4B may correspond to the signal generator 60 of FIG. 6 and may include circuits of FIGS. 8A and 8B. Also, in FIG. 10, the control signal CTR may include a first control signal CTR1 and a second control signal CTR2. Hereinafter, FIG. 10 is described with reference to FIGS. 4B and 6.

Referring to FIG. 10, at a time point t11, the selection signal SEL may have a value 0x0000, that is, a hexadecimal value 0000, and thus, a first PUF cell may be selected. A k+1th bit CTR1[k+1] of the first control signal CTR1 may be activated, and an m+1th bit CTR2[m+1] of the second control signal CTR2 may be deactivated. First to k-th bits CTR1[k:1] of the first control signal CTR1 may gradually decrease from the maximum value H to the minimum value L from the time point t11 to a time point t12 and then increase back to the maximum value H. Therefore, the resistance of a pull-up circuit may gradually decrease and then increase again, and the first signal S11 of the first PUF cell may gradually increase and then decrease again, as shown in FIG. 10. Due to the first signal S11, a second signal S21 may gradually decrease and then increase again, and, as shown in FIG. 10, the second signal S21 may intersect with the threshold level of a third logic gate indicated by the dotted line. Therefore, a third signal S31 may vary as shown in FIG. 10, and a first output bit OUT1 may be flipped between the time point t11 and the time point t12. The controller 42b may determine the first PUF cell as a weak PUF cell based on the flip of the first output bit OUT1.

At the time point t12, the k+1th bit CTR[k+1] of the first control signal CTR1 may be deactivated, and the m+1th bit CTR2[m+1] of the second control signal CTR2 may be activated. First to m-th bits CTR2[m:1] of the second control signal CTR2 may gradually increase from the minimum value L to the maximum value H from the time point t12 to a time point t13 and then decrease back to the minimum value L. Therefore, the resistance of a pull-down circuit may gradually decrease and then increase again, and the first signal S11 of the first PUF cell may gradually decrease and then increase again, as shown in FIG. 10. Due to the first signal S11, a second signal S21 may gradually increase and then decrease again, and, as shown in FIG. 10, the second signal S21 may not intersect with the threshold level of the third logic gate indicated by the dotted line. Therefore, the third signal S31 may be approximately maintained at a low level as shown in FIG. 10, and the first output bit OUT1 may be maintained at a high level from the time point t12 to the time point t13.

At the time point t13, the selection signal SEL may have a value 0x0001, that is, a hexadecimal value 0001, and thus, a second PUF cell may be selected. From the time point t13 to a time point t15, the first control signal CTR1 and the second control signal CTR2 may be generated in the same regard as those from the time point t11 to the time point t13. As shown in FIG. 10, from the time point t13 to the time point t15, a first signal S12 of the second PUF cell may have a relatively high offset, and a second signal S22 may not intersect with the threshold level of a third logic gate. Therefore, a third signal S32 may be approximately maintained at a high level as shown in FIG. 10, and a second output bit OUT2 may be maintained at a low level from the time point t13 to the time point t15. The controller 42b may determine the second PUF cell as a stable PUF cell based on the second output bit OUT2 that is maintained constant from the time point t13 to the time point t15.

Figure 11:
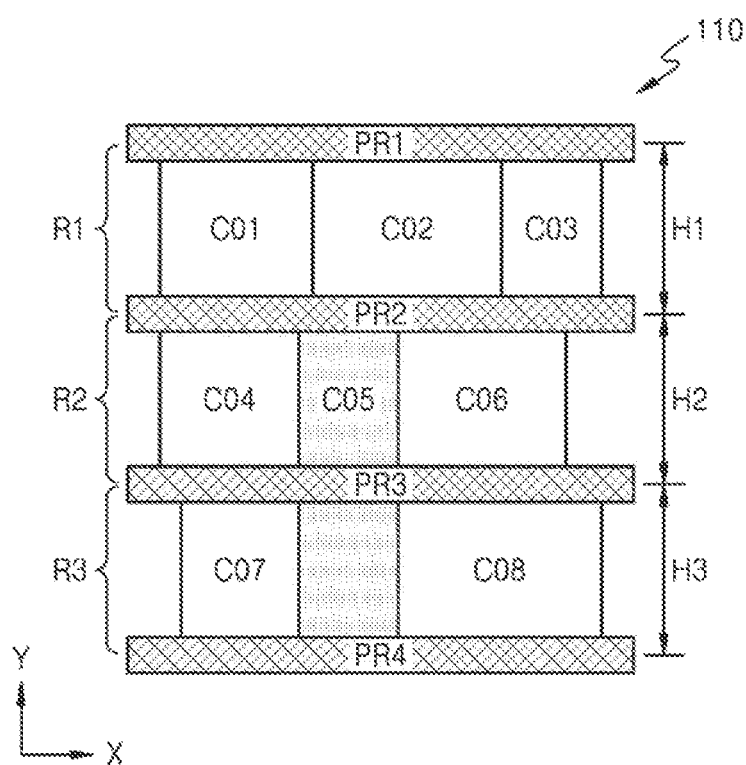
FIG. 11 is a diagram showing an integrated circuit according to an example embodiment.

FIG. 11 is a diagram showing an integrated circuit according to an example embodiment. For example, FIG. 11 is a plan view schematically showing a layout of an integrated circuit 110 included in the device 10 of FIG. 1 and manufactured through a semiconductor process.

Referring to FIG. 11, the integrated circuit 110 may include standard cells. A standard cell is a layout unit included in an integrated circuit and may be designed to perform a pre-defined function. For example, as shown in FIG. 11, the integrated circuit 110 may include first to fourth power rails PR1 to PR4 that extend in the X-axis direction and provide a positive supply voltage and a negative supply voltage to standard cells, and first to eighth standard cells C01 to C08 may be arranged between two power rails from among the first to fourth power rails PR1 to PR4. First to third standard cells C01 to C03 may be arranged in a first row R1 between a first power rail PR1 and a second power rail PR2, a fourth standard cell C04 and a sixth standard cell C06 may be arranged in a second row R2 between the second power rail PR2 and a third power rail PR3, and a seventh standard cell C07 and an eighth standard cell C08 may be arranged in a third row R3 between the third power rail PR3 and a fourth power rail PR4. A fifth standard cell C05 is a multiple-height cell and may be continuously disposed in the second row R2 and the third row R3 between the second power rail PR2 and the fourth power rail PR4. First to third heights H1 to H3 of the first to third rows R1 to R3 may be the same as or different from one another.

A PUF cell may include logic gates as described above with reference to FIGS. 2A to 2C, and a signal generator and a demultiplexer may include only transistors as described above with reference to FIGS. 8A, 8B, and 9. Therefore, the device 10 of FIG. 1 may be implemented as an integrated circuit 110 including standard cells without specially designed elements. Examples of a resistor string and a demultiplexer including standard cells are described below with reference to FIGS. 12 and 13.

Figure 12:
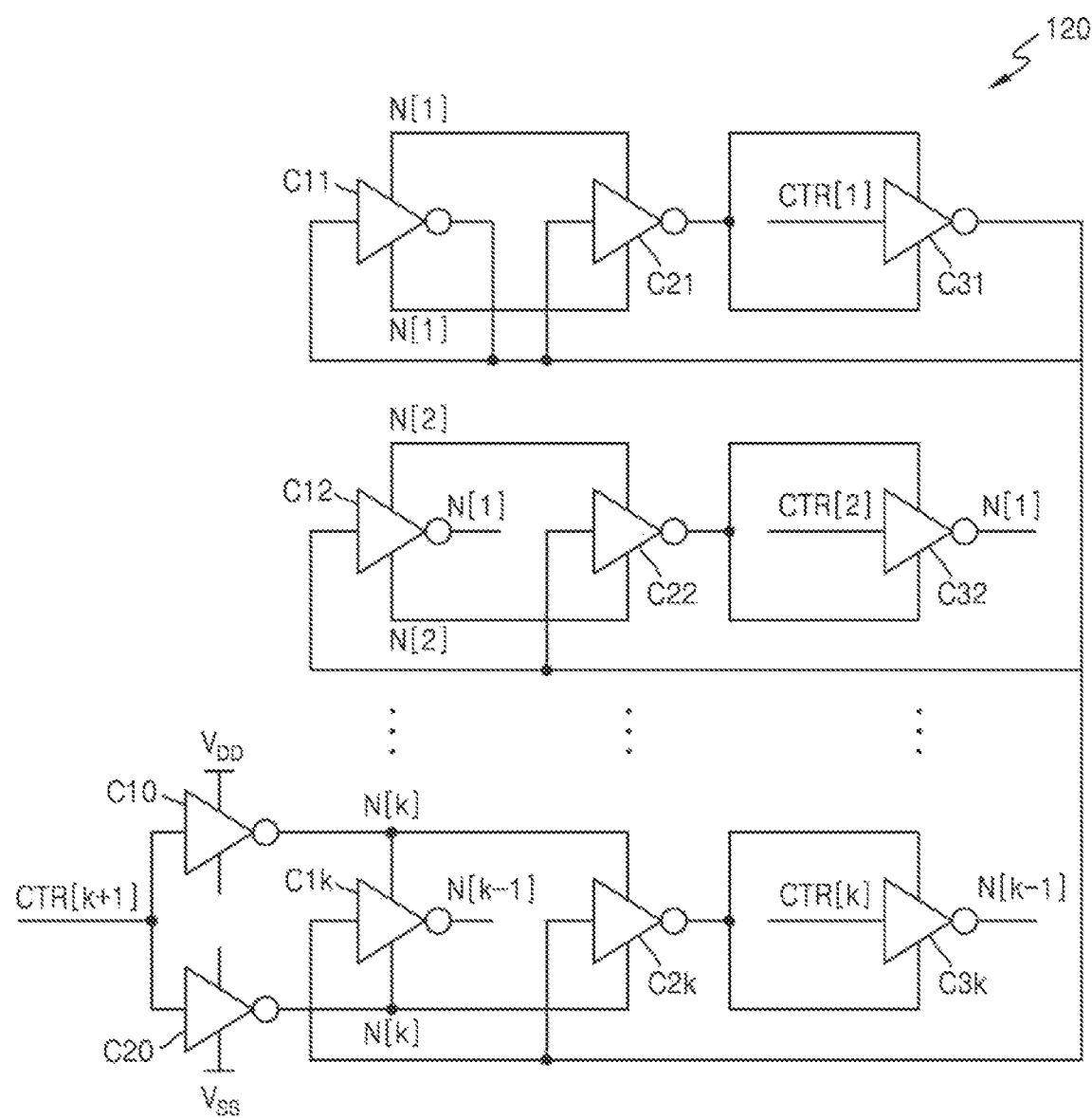
FIG. 12 is a diagram showing a resistor string according to an example embodiment.

FIG. 12 is a diagram showing a resistor string 120 according to an example embodiment. As described above with reference to FIG. 11, the resistor string 120 included in a signal generator may include standard cells, and thus, the resistor string 120 may be implemented without specially designed elements. In the resistor string 120 of FIG. 12, a pull-up circuit and a pull-down circuit may receive k-bit control signals CTR in common (k=m). Hereinafter, FIG. 12 is described with reference to FIGS. 8A and 8B.

Referring to FIG. 12, the resistor string 120 may include cells corresponding to inverters in which a node receiving a positive supply voltage and a node receiving a negative supply voltage are used for signals. For example, the resistor string 120 may include cells C10 and C20 each including the PFET $MS_{PU}$ of FIG. 8A and the NFET MSPD of FIG. 8B. Also, the resistor string 120 may include cells C1k, C2k, and C3k respectively corresponding to PFETs $M_{Pk}$, $MP_{pk}$, and $MS_{pk}$ of FIG. 8A and NFETs $M_{Nm}$, $M_{nm}$, and $MS_{nm}$ of FIG. 8B. Similarly, the resistor string 120 may further include cells C11, C21, C31, C12, C22, and C32 respectively corresponding to PFETs and NFETs.

Figure 13:
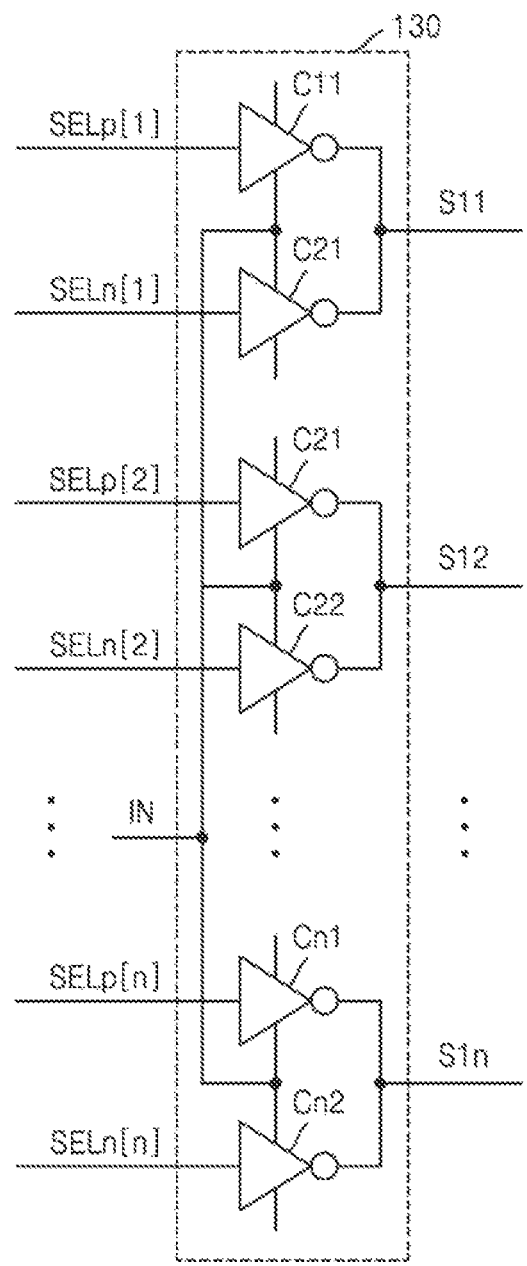
FIG. 13 is a diagram showing a demultiplexer according to an example embodiment.

FIG. 13 is a diagram showing a demultiplexer 130 according to an example embodiment. As described above with reference to FIG. 11, the demultiplexer 130 included in a signal generator may include standard cells, and thus, the demultiplexer 130 may be implemented without specially designed elements. Hereinafter, FIG. 13 is described with reference to FIG. 9.

Referring to FIG. 13, the demultiplexer 130 may include cells corresponding to inverters in which a node receiving a positive supply voltage and a node receiving a negative supply voltage are used for signals. For example, cells C11 and C21 may each include an NFET and a PFET of the first transmission gate TG1 of FIG. 9. Similarly, cells C21 and C22 may each include an NFET and a PFET of the second transmission gate TG2 of FIG. 9, and cells Cn1 and Cn2 may each include an NFET and a PFET of an n-th transmission gate TGn of FIG. 9.

Figure 14:
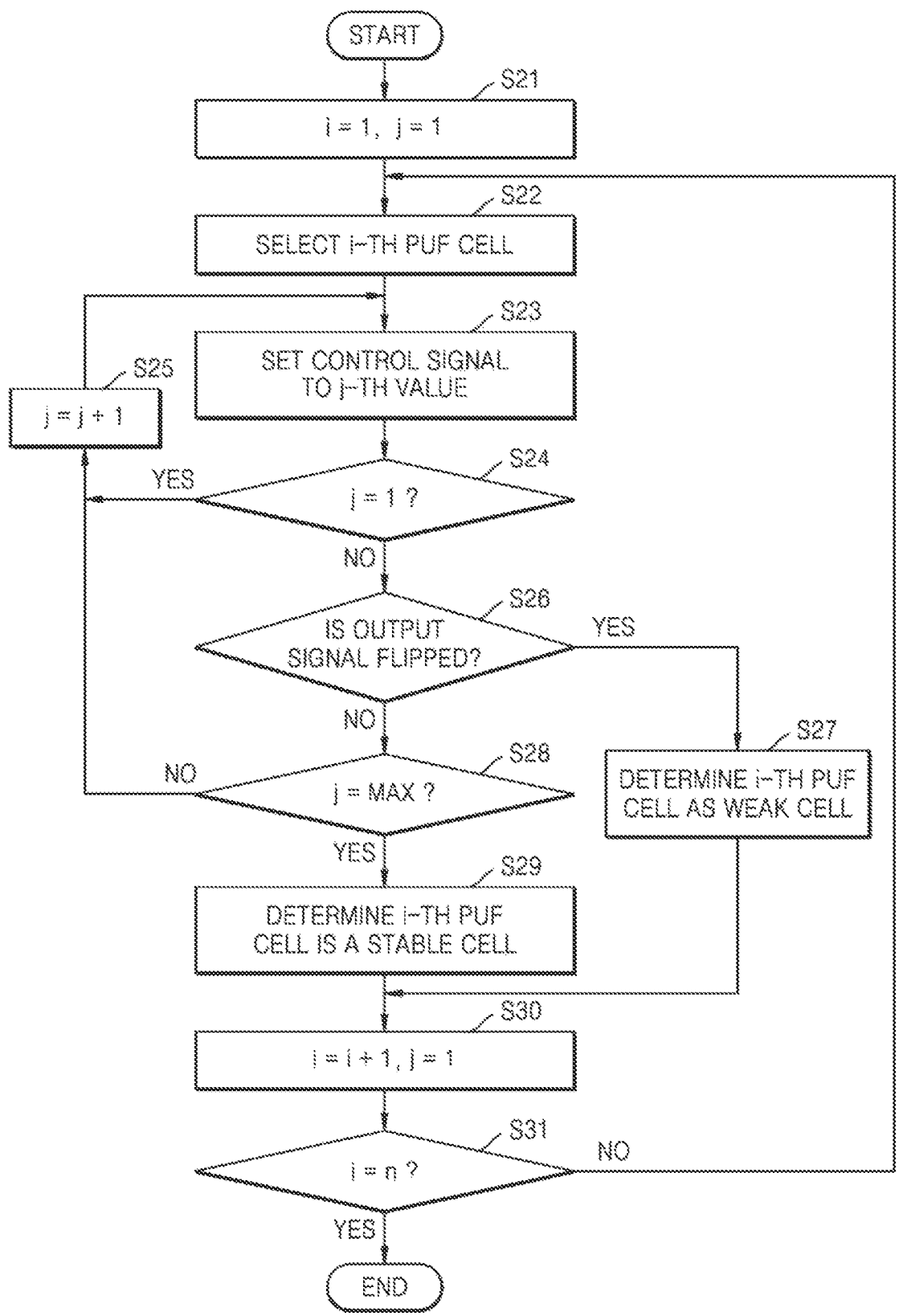
FIG. 14 is a flowchart of a method of providing a physically unclonable function, according to an example embodiment.

FIG. 14 is a flowchart of a method of providing a PUF, according to an example embodiment. For example, the flowchart of FIG. 14 shows a method of detecting a weak PUF cell in a test mode. According to some example embodiments, the method of FIG. 14 may be performed by the verification circuit 14 of FIG. 1, the controller 42a of FIG. 4A, or the controller 42b of FIG. 4B. Hereinafter, FIG. 14 is described with reference to FIGS. 1 and 4B.

Referring to FIG. 14, variables may be initialized in operation S21. A variable i may represent the index of a PUF cell, and a variable j may represent the index of the level of the input signal IN. As shown in FIG. 14, the variable i and the variable j may each be set to 1 (i.e., initialized).

In operation S22, an i-th PUF cell may be selected. For example, the controller 42b may provide the selection signal SEL to the PUF circuit 12, and may select the i-th PUF cell from among the first to n-th PUF cells PUF1 to PUFn according to the selection signal SEL. Therefore, the output signal OUT may correspond to the output bit of the i-th PUF cell. Also, the demultiplexer 46b may provide the input signal IN to the i-th PUF cell in response to the selection signal SEL.

In operation S23, the control signal CTR may be set to a j-th value. For example, the controller 42b may set the control signal CTR to the j-th value, and thus, the signal generator 44b may generate the input signal IN having a magnitude corresponding to the j-th value.

In operation S24, it may be determined whether the variable j is 1. As shown in FIG. 14, when the variable j is 1, the variable j may be increased by 1 in operation S25, and operation S23 may be performed subsequently. On the other hand, when the variable j is not 1, operation S26 may be performed subsequently. As described above with reference to FIG. 10, to determine whether the output signal OUT is flipped, when there is no previous value of the output signal OUT (i.e., when the variable j is 1), operations S25 and S23 may be subsequently performed.

In operation S26, it may be determined whether the output signal OUT is flipped. For example, the controller 42b may determine that the output signal OUT is flipped when there is a change between the level of the output signal OUT corresponding to a previous value of the variable j (i.e., j−1) and the level of the output signal OUT corresponding to the current value of the variable j. As shown in FIG. 14, when the output signal OUT is flipped, the i-th PUF cell may be determined as a weak cell in operation S27, and operation S30 may be subsequently performed. On the other hand, when the output signal OUT is not flipped, operation S28 may be performed subsequently.

In operation S28, it may be determined whether the variable j is the maximum value MAX. For example, the controller 42b may determine whether all possible levels of the input signal IN have been generated. As shown in FIG. 14, when the variable j is different from the maximum value MAX, that is, when possible levels of the input signal IN remain, operation S25 may be performed subsequently. On the other hand, when the variable j is identical to the maximum value MAX, that is, when all possible levels of the input signal IN have been generated, operation S29 may be performed subsequently.

In operation S29, the i-th PUF cell may be determined as a stable cell. For example, the controller 42b may determine the i-th PUF cell as a stable cell when the output signal OUT is not flipped at all possible levels of the input signal IN.

In operation S30, the variable i and the variable j may be set. As shown in FIG. 14, the variable i may be increased by 1 to correspond to the index of a next PUF cell. Also, the variable j may be initialized by being set to 1. In operation S31, it may be determined whether the variable i is identical to the number n of PUF cells. When all n PUF cells are tested, the variable i may be identical to n, and the method of FIG. 14 may be terminated. On the other hand, when there is a PUF cell to be tested from among n PUF cells, the variable i may be less than n, and operation S22 may be subsequently performed. Therefore, the input signal IN may be sequentially provided to the n PUF cells.

Figure 15A:
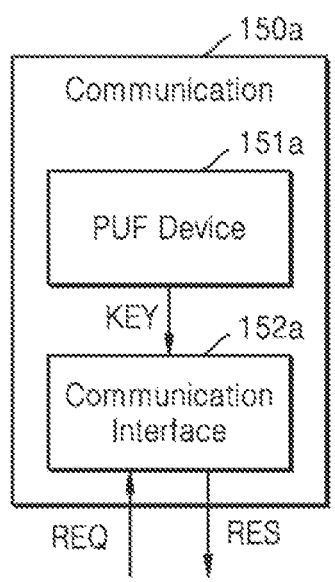
FIGS. 15A, 15B and 15C are block diagrams showing examples of a system including a device for providing a physically unclonable function according to example embodiments.
Figure 15B:
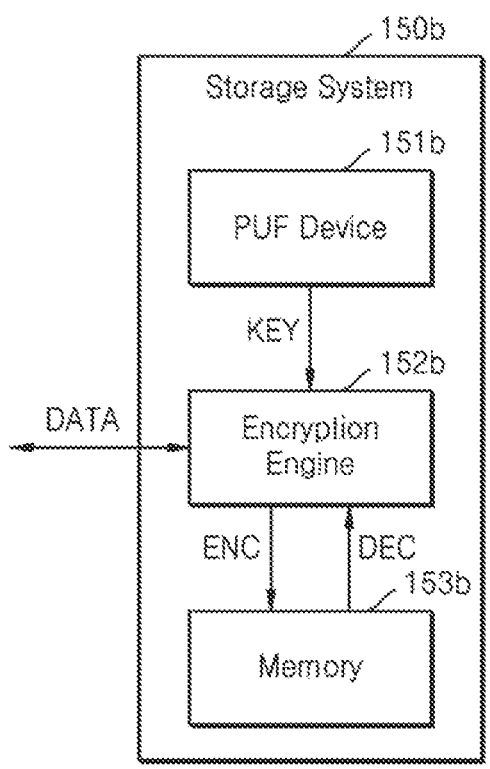
Figure 15C:
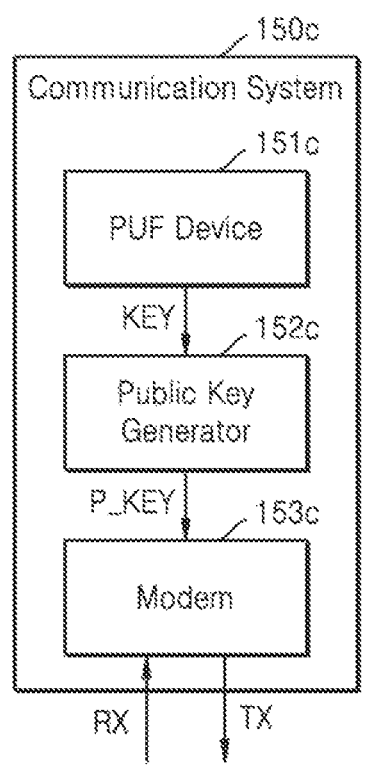

FIGS. 15A to 15C are block diagrams showing examples of a system including a device for providing a PUF according to example embodiments. As described above with reference to the drawings, a device providing a PUF may have high stability and reliability and may be implemented without specially designed elements. Devices described above with reference to the drawings may be included as PUF devices 151a, 151b, and 151c in systems 150a, 150b, and 150c of FIGS. 15A to 15C and may be used to generate a security key KEY.

Referring to FIG. 15A, an identification system 150a may include a PUF device 151a and a communication interface 152a. The identification system 150a may transmit a response RES including identification information regarding the identification system 150a to the outside in response to a request REQ received from the outside. For example, the identification system 150a may be a radio frequency identification (RFID) identification system, and the identification information included in the response RES may be used to identify a user of the identification system 150a. Identification information included in the response RES may be generated based on the security key KEY generated by the PUF device 151a.

Referring to FIG. 15B, a storage system 150b may include a PUF device 151b, an encryption engine 152b, and a memory 153b. The storage system 150b may store data DATA received from the outside or transmit stored data DATA to the outside. For security of stored data, the storage system 150b may encrypt the data DATA received from the outside by using the security key KEY and store encrypted data ENC in the memory 153b. Also, the encryption engine 152b may decrypt the encrypted data ENC read from the memory 153b by using the security key KEY, and transmit decrypted data DATA to the outside. For example, the storage system 150b may be a portable storage device or a storage device of a storage server.

Referring to FIG. 15C, a communication system 150c may include a PUF device 151c, a public key generator 152c, and a modem 153c. The communication system 150c may communicate with another communication device by receiving a signal RX from the other communication system or transmitting a signal TX to the other communication system. The public key generator 152c may generate a public key P_KEY based on the security key KEY generated by the PUF device 151c, and the modem 153c may transmit an encrypted signal TX or decrypt the signal RX, based on the public key P_KEY. In this regard, the communication system 150c may perform secure communication with another communication system based on the security key KEY, and, for example, the communication system 150c may be a portable wireless communication terminal.

While aspects of example embodiments have been particularly shown and described, it will be understood that various changes in form and details may be made therein without departing from the spirit and scope of the following claims.

What is claimed is:

1. A device comprising:
a plurality of physically unclonable function (PUF) cells, each of the plurality of PUF cells comprising at least one logic gate and being configured to generate an output signal based on at least one threshold level of the at least one logic gate;
a signal generator configured to generate an input signal that is provided to each of the plurality of PUF cells, wherein the signal generator comprises a resistor string connected to an input node at which the input signal is generated; and
a controller configured to, in a test mode, generate a control signal to control the signal generator to vary the input signal to control the plurality of PUF cells to output a plurality of output signals according to the input signal, and identify at least one weak PUF cell from among the plurality of PUF cells based on the output signal generated by the at least one weak PUF cell being an unstable output signal,
wherein the controller is further configured to disconnect the plurality of PUF cells from the signal generator in a normal mode, and
wherein the resistor string comprises:
a series of first resistors connected between a positive voltage node and the input node; and
a first switch connected in series to the series of first resistors between the positive voltage node and the input node, and configured to operate based on a first bit of the control signal.

2. The device of claim 1, wherein each of the plurality of PUF cells is further configured to generate the output signal based on the input signal and the at least one threshold level in the test mode, and generate the output signal based on the at least one threshold level in the normal mode.

3. The device of claim 1, wherein each of the plurality of PUF cells is further configured to be selectively enabled based on a selection signal, and
wherein the controller is further configured to generate the selection signal, such that one of the plurality of PUF cells is enabled and remaining PUF cells of the plurality of PUF cells are disabled in the normal mode.

4. The device of claim 3, further comprising a demultiplexer provided between the plurality of PUF cells and the signal generator, and configured to provide the input signal to the one of the plurality of PUF cells based on the selection signal,
wherein the controller is further configured to generate the selection signal to control the input signal to be sequentially provided to each of the plurality of PUF cells in the test mode.

5. The device of claim 1, further comprising a non-volatile memory,
wherein the controller is further configured to write identification information regarding the at least one weak PUF cell to the non-volatile memory in the test mode.

6. The device of claim 1, wherein the controller is further configured to disable the signal generator in the normal mode.

7. The device of claim 1, wherein the control signal is a multi-bit signal, and
wherein the resistor string further comprises:
a series of second resistors connected between a negative voltage node and the input node; and
a second switch connected in series to the series of second resistors between the negative voltage node and the input node, and configured to operate based on a second bit of the control signal.

8. The device of claim 7, wherein the resistor string comprises:
a series of first resistor circuits, one of the series of first resistor circuits comprising a third resistor and a third switch connected to each other in series and connected to the series of first resistors in parallel, wherein the third switch is configured to operate based on a third bit of the control signal; and
a series of second resistor circuits, one of the series of second resistor circuits comprising a fourth resistor and a fourth switch connected to each other in series and connected to the series of second resistors in parallel, wherein the fourth switch is configured to operate based on a fourth bit of the control signal.

9. The device of claim 8, wherein each of the series of first resistors and the third resistor comprises a p-channel field effect transistor (PFET) having a gate connected to the input node, and wherein each of the series of second resistors and the fourth resistor comprises an n-channel field effect transistor (NFET) having a gate connected to the input node.

10. The device of claim 1, wherein each of the plurality of PUF cells and the signal generator comprises standard cells arranged between a plurality of power rails extending in parallel with one another.

11. The device of claim 1, wherein the resistor string comprises a pull-up circuit and a pull-down circuit, the pull-up circuit comprises the series of first resistors and the first switch, and the input node is connected between the pull-up circuit and the pull-down circuit.

12. A device comprising:
a plurality of physically unclonable function (PUF) cells;
a signal generator configured to generate an input signal that is provided to each of the plurality of PUF cells, wherein the signal generator comprises a resistor string connected to an input node at which the input signal is generated; and
a controller configured to, in a test mode, generate a control signal to control the signal generator to vary the input signal to control the plurality of PUF cells to output a plurality of output signals according to the input signal, and identify at least one weak PUF cell from among the plurality of PUF cells based on an output signal generated by the at least one weak PUF cell being an unstable output signal,
wherein each of the plurality of PUF cells comprises at least one logic gate, is configured to generate the output signal independently of the input signal based on at least one threshold level of the at least one logic gate in a normal mode, and generate the output signal based on the input signal and the at least one threshold level in the test mode, and
wherein the resistor string comprises:
a series of first resistors connected between a positive voltage node and the input node; and
a first switch connected in series to the series of first resistors between the positive voltage node and the input node, and configured to operate based on a first bit of the control signal.

13. The device of claim 12, wherein each of the plurality of PUF cells is selectively enabled based on a selection signal, and
wherein the controller is further configured to generate the selection signal to enable one of the plurality of PUF cells is enabled and remaining PUF cells of the plurality of PUF cells are disabled in the normal mode.

14. The device of claim 13, further comprising a demultiplexer provided between the plurality of PUF cells and the signal generator, and configured to provide the input signal to the one of the plurality of PUF cells based on the selection signal,
wherein the controller is further configured to generate the selection signal to control the input signal to be sequentially provided to each of the plurality of PUF cells in the test mode.

15. The device of claim 12, further comprising non-volatile memory,
wherein the controller is further configured to write identification information regarding the at least one weak PUF cell to the non-volatile memory in the test mode.

16. The device of claim 12, wherein each of the plurality of PUF cells and the signal generator comprises standard cells arranged between a plurality of power rails extending in parallel with one another.

17. A method comprising:
controlling a resistor string of a signal generator to generate an input signal at an input node by controlling a first switch based on a first bit of a control signal, wherein the first switch is connected in series with a series of first resistors between a positive voltage node and the input node;
providing the input signal to each of a plurality of physically unclonable function (PUF) cells in a test mode;
in the test mode, changing the input signal;
in the test mode, controlling the plurality of PUF cells to generate a plurality of output signals based on the input signal and at least one threshold level of at least one logic gate included in each of the plurality of PUF cells;
in the test mode, identifying at least one weak PUF cell from among the plurality of PUF cells based on an output signal, among the plurality of output signals, generated by the at least one weak PUF cell being an unstable output signal; and
generating the plurality of output signals independently of the input signal, based on the at least one threshold level, in a normal mode.

18. The method of claim 17, wherein the generating the plurality of output signals comprises enabling one of the plurality of PUF cells and disabling remaining PUF cells of the plurality of PUF cells.

19. The method of claim 18, wherein the providing the input signal comprises sequentially providing the input signal to each of the plurality of PUF cells.

20. The method of claim 17, further comprising, in the test mode, writing identification information regarding the at least one weak PUF cell into a non-volatile memory.

* * * * *